United States Patent
Wen et al.

(10) Patent No.: US 11,310,066 B2
(45) Date of Patent: Apr. 19, 2022

(54) METHOD AND APPARATUS FOR PUSHING INFORMATION

(71) Applicant: Baidu Online Network Technology (Beijing) Co., Ltd., Beijing (CN)

(72) Inventors: Tianwei Wen, Beijing (CN); Yunyang Ma, Beijing (CN); Rui Zhang, Beijing (CN); Jinmei Luo, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/235,749

(22) Filed: Dec. 28, 2018

(65) Prior Publication Data
US 2019/0327105 A1 Oct. 24, 2019

(30) Foreign Application Priority Data
Apr. 19, 2018 (CN) .......................... 201810353511.X (51) Int. Cl.
| | |
|---|---|
| *H04L 12/18* | (2006.01) |
| *H04N 21/478* | (2011.01) |
| *H04N 21/643* | (2011.01) |

(52) U.S. Cl.
CPC ....... *H04L 12/1859* (2013.01); *H04N 21/478* (2013.01); *H04N 21/64322* (2013.01)

(58) Field of Classification Search
CPC ............. H04L 12/1859; H04N 21/478; H04N 21/64322; G06F 16/9535
See application file for complete search history.

(56) References Cited

U.S. PATENT DOCUMENTS

| | | | | |
|---|---|---|---|---|
| 10,158,545 | B1 * | 12/2018 | Marrone | ................ H04L 12/66 |
| 2002/0010746 | A1 * | 1/2002 | Jilk, Jr. | .................. H04L 51/28 709/206 |
| 2003/0122922 | A1 * | 7/2003 | Saffer | ............... H04N 7/17336 348/14.01 |
| 2005/0033855 | A1 * | 2/2005 | Moradi | ............... G06Q 10/107 709/231 |

(Continued)

FOREIGN PATENT DOCUMENTS

| | | | | | |
|---|---|---|---|---|---|
| CN | 105760523 | | * | 7/2016 | ......... G06F 16/9535 |
| CN | 105760523 | A | * | 7/2016 | ......... G06F 16/9535 |

(Continued)

*Primary Examiner* — Douglas B Blair
*Assistant Examiner* — Abdelbasst Talioua
(74) *Attorney, Agent, or Firm* — Knobbe, Martens, Olson & Bear, LLP (57) ABSTRACT

Embodiments of the present disclosure disclose a method and apparatus for pushing information. An implementation of the method includes: receiving a network connection request sent by a TV terminal, the network connection request including an address related to the TV terminal; selecting, based on the address, a user identifier associated with the address in a candidate user identifier set; acquiring a search keyword searched by a user indicated by the selected user identifier within a target period; and selecting, based on the search keyword, to-be-pushed information in a preset to-be-pushed information set, and pushing the selected to-be-pushed information to the TV terminal. This embodiment improves the richness of the to-be-pushed information while improving the pertinence of information push.

10 Claims, 6 Drawing Sheets

(56) References Cited

U.S. PATENT DOCUMENTS

| | | | |
|---|---|---|---|
| 2008/0256555 A1* | 10/2008 | Birov | G06F 9/451 |
| | | | 719/315 |
| 2009/0030991 A1* | 1/2009 | Vakkalanka | H04L 51/08 |
| | | | 709/206 |
| 2009/0092051 A1* | 4/2009 | Miyata | H04L 12/2872 |
| | | | 370/236 |
| 2012/0272266 A1* | 10/2012 | Ou | H04L 67/20 |
| | | | 725/34 |
| 2012/0331495 A1* | 12/2012 | Hyun | H04N 21/478 |
| | | | 725/10 |
| 2015/0379568 A1* | 12/2015 | Balasubramanian | |
| | | | G06Q 30/0255 |
| | | | 705/14.53 |
| 2016/0044494 A1* | 2/2016 | Bang | H04W 8/183 |
| | | | 370/254 |
| 2016/0092581 A1* | 3/2016 | Joshi | G06F 16/3338 |
| | | | 707/732 |
| 2017/0011113 A1* | 1/2017 | Sparrow | G06Q 30/0269 |
| 2017/0134181 A1* | 5/2017 | Wu | H04L 12/185 |
| 2018/0227270 A1* | 8/2018 | Zhang | H04L 61/6022 |
| 2018/0295124 A1* | 10/2018 | Li | H04L 63/0815 |
| 2018/0310136 A1* | 10/2018 | Xu | G08C 17/02 |
| 2019/0012392 A1* | 1/2019 | Chen | G06F 16/313 |
| 2019/0114840 A1* | 4/2019 | Zankowski | G06T 19/006 |
| 2019/0124001 A1* | 4/2019 | Miu | H04L 45/72 |
| 2019/0173804 A1* | 6/2019 | Nicas | H04L 47/823 |
| 2019/0197512 A1* | 6/2019 | Nuzzi | G06Q 30/06 |

FOREIGN PATENT DOCUMENTS

| | | | | |
|---|---|---|---|---|
| CN | 105760523 A | | 7/2016 | |
| CN | 105979577 A | | 9/2016 | |
| CN | 106131243 A | * | 11/2016 | H04L 43/04 |
| CN | 107172151 A | | 9/2017 | |
| JP | 2006033739 A | | 2/2006 | |
| JP | 2010034698 A | | 2/2010 | |
| JP | 2011191614 A | | 9/2011 | |

* cited by examiner

METHOD AND APPARATUS FOR PUSHING INFORMATION

CROSS-REFERENCE TO RELATED APPLICATIONS

This application claims priority to Chinese Patent Application No. 201810353511.X, filed with the China National Intellectual Property Administration (CNIPA) on Apr. 19, 2018, the content of which is incorporated herein by reference in its entirety.

TECHNICAL FIELD

Embodiments of the present disclosure relate to the field of computer technology, and specifically to a method and apparatus for pushing information.

BACKGROUND

With the development of Internet technology, smart TV enters thousands of households. Smart TV is a new TV product having a fully open platform and is equipped with an operating system. While enjoying ordinary TV programs, users may install or uninstall various application software by themselves, and keep on expanding and upgrading the functions of smart TV. Smart TV may meet diverse and personalized needs of the users. The existing method for pushing information to a TV terminal is often based on user behavior information (for example, search information, click information, and video browsing information of a user in the TV terminal) stored by the TV terminal itself, so that to-be-pushed information is selected to meet the personalized needs of the users.

SUMMARY

Embodiments of the present disclosure provide a method and apparatus for pushing information.

In a first aspect, the embodiments of the present disclosure provide a method for pushing information, the method including: receiving a network connection request sent by a TV terminal, the network connection request including an address related to the TV terminal; selecting, based on the address, a user identifier associated with the address in a candidate user identifier set; acquiring a search keyword searched by a user indicated by the selected user identifier within a target period; and selecting, based on the search keyword, to-be-pushed information in a preset to-be-pushed information set, and pushing the selected to-be-pushed information to the TV terminal.

In some embodiments, the address related to the TV terminal includes an Internet Protocol address of the TV terminal; and the selecting, based on the address, a user identifier associated with the address in a candidate user identifier set, includes: selecting, in the candidate user identifier set, the user identifier, an corresponding Internet Protocol address corresponding to the user identifier being the Internet Protocol address of the TV terminal, where a corresponding relationship between the user identifier and the Internet Protocol address is pre-stored.

In some embodiments, the address related to the TV terminal includes a media access control address of a router connected to the TV terminal; and the selecting, based on the address, a user identifier associated with the address in a candidate user identifier set, includes: querying in a preset routing relationship table a media access control address set of a user terminal connected to the router, using the media access control address of the router connected to the TV terminal, wherein the routing relationship table is used to represent a corresponding relationship between a media access control address of a target router and a media access control address of a user terminal connected to the target router; and selecting, in the candidate user identifier set, a user identifier, a media access control address corresponding to the user identifier existing in the media access control address set, wherein a corresponding relationship between the user identifier and the media access control address is pre-stored.

In some embodiments, the network connection request is sent by the TV terminal in response to detecting a predetermined operation of the user, and the predetermined operation includes at least one of: a power on operation, or a video browsing operation.

In some embodiments, the selecting, based on the search keyword, to-be-pushed information in a preset to-be-pushed information set includes: determining, for the to-be-pushed information in the preset to-be-pushed information set, a matching degree between the search keyword and the to-be-pushed information; and selecting a preset number of pieces of to-be-pushed information from the to-be-pushed information set in a descending order of the matching degree.

In a second aspect, the embodiments of the present disclosure provide an apparatus for pushing information, the apparatus including: a receiving unit, configured to receive a network connection request sent by a TV terminal, the network connection request including an address related to the TV terminal; a selection unit, configured to select, based on the address, a user identifier associated with the address in a candidate user identifier set; an acquiring unit, configured to acquire a search keyword searched by a user indicated by the selected user identifier within a target period; and a pushing unit, configured to select, based on the search keyword, to-be-pushed information in a preset to-be-pushed information set, and push the selected to-be-pushed information to the TV terminal.

In some embodiments, the address related to the TV terminal includes an Internet Protocol address of the TV terminal; and the selection unit is further configured to select, based on the address, a user identifier associated with the address in a candidate user identifier set according to following method: selecting, in the candidate user identifier set, the user identifier, an Internet Protocol address corresponding to the user identifier being the Internet Protocol address of the TV terminal, wherein a corresponding relationship between the user identifier and the Internet Protocol address is pre-stored.

In some embodiments, the address related to the TV terminal includes a media access control address of a router connected to the TV terminal; and the selection unit is further configured to select, based on the address, a user identifier associated with the address in a candidate user identifier set according to following method: querying in a preset routing relationship table a media access control address set of a user terminal connected to the router, using the media access control address of the router connected to the TV terminal, wherein the routing relationship table is used to represent a corresponding relationship between a media access control address of a target router and a media access control address of a user terminal connected to the target router; and selecting, in the candidate user identifier set, a user identifier, a media access control address corresponding to the user identifier existing in the media access control address set, wherein a corresponding relationship between the user identifier and the media access control address is pre-stored.

In some embodiments, the network connection request is sent by the TV terminal in response to detecting a predetermined operation of the user, and the predetermined operation includes at least one of: a power on operation, or a video browsing operation.

In some embodiments, the pushing unit is further configured to select, based on the search keyword, to-be-pushed information in a preset to-be-pushed information set according to following method: determining, for the to-be-pushed information in the preset to-be-pushed information set, a matching degree between the search keyword and the to-be-pushed information; and selecting a preset number of pieces of to-be-pushed information from the to-be-pushed information set in a descending order of the matching degree.

In a third aspect, the embodiments of the present disclosure provide an electronic device, including: one or more processors; and a storage apparatus, storing one or more programs thereon, the one or more programs, when executed by the one or more processors, cause the one or more processors to implement the method for pushing information according to any one of the embodiments.

In a fourth aspect, the embodiments of the present disclosure provide a computer readable medium, storing a computer program thereon, the computer program, when executed by a processor, implements the method for pushing information according to any one of the embodiments.

The method and apparatus for pushing information provided by the embodiments of the present disclosure first receive a network connection request sent by a TV terminal, the network connection request including an address related to the TV terminal, then may select, based on the address related to the TV terminal, a user identifier associated with the address in a candidate user identifier set, then may acquire a search keyword searched by a user indicated by the selected user identifier within a target period, and finally may select, based on the search keyword, to-be-pushed information in a preset to-be-pushed information set, and push the selected to-be-pushed information to the TV terminal. Therefore, the address related to the TV terminal is effectively utilized, personalized information of the audience of the TV terminal is queried, and the richness of the to-be-pushed information is improved while improving the pertinence of information push.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis.

The present disclosure will be described below in detail with reference to the accompanying drawings and in combination with the embodiments.

Figure 1:
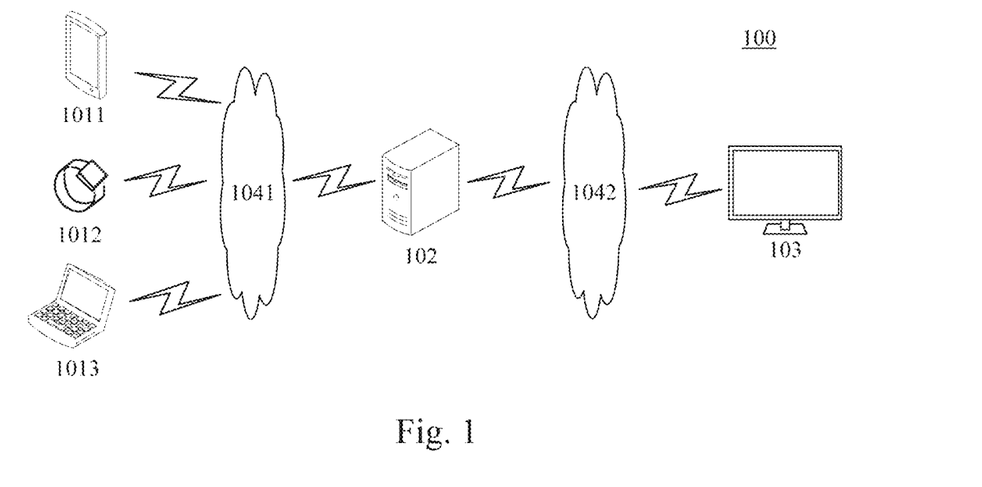
FIG. 1 is a system architecture diagram to which some embodiments of the present disclosure may be applied.

FIG. 1 illustrates a system architecture 100 to which an embodiment of a method for pushing information or an apparatus for pushing information of the present disclosure may be applied.

As shown in FIG. 1, the system architecture 100 may include terminal devices 1011, 1012, 1013, a server 102, a TV terminal 103 and networks 1041, 1042. The network 1041 is configured to provide a communication link medium between the terminal devices 1011, 1012, 1013 and the server 102. The network 1042 is configured to provide a communication link medium between the TV terminal 103 and the server 102. The networks 1041, 1042 may include various types of connections, such as wired, wireless communication links, or optical fibers.

The user may use the TV terminal 103 to interact with the server 102 via the network 1042 to send or receive messages and the like. For example, the TV terminal 103 may be used to send a network connection request to the server 102.

The user may interact with the server 102 via the network 1041 using the user terminals 1011, 1012, 1013 to send or receive messages and the like. For example, the user may upload search information, browsing information, click information, or the like of the user to the server 102 using the user terminals 1011, 1012, and 1013.

The user terminals 1011, 1012 and 1013 may be hardware or software. When the user terminals 1011, 1012 and 1013 are hardware, they may be various electronic devices having display screens and supporting information interaction, including but not limited to smart phones, tablets, smart watches, e-book readers, and MP3 players (Moving Picture Experts Group Audio Layer III), MP4 (Moving Picture Experts Group Audio Layer IV) players, laptop portable computers, desktop computers, etc. When the user terminals 1011, 1012 and 1013 are software, they may be installed in the above-listed electronic devices. They may be implemented as a plurality of software or software modules, or as a single software or software module, which is not specifically limited here.

The server 102 may be a server providing various services, for example, a backend server that processes a network connection request sent by the TV terminal 103. The backend server may process such as analyze data such as the received network connection request, and feed back the processing result (for example, selected to-be-pushed information) to the TV terminal 103.

It should be noted that the method for pushing information provided by the embodiments of the present disclosure may be executed by the server 102. Accordingly, the apparatus for pushing information is usually provided in the server 102.

It should be noted that the server may be hardware or software. When the server is hardware, it may be implemented as a distributed server cluster composed of multiple servers, or may be implemented as a single server. When the server is software, it may be implemented as a plurality of software or software modules (for example, for providing distributed services), or as a single software or software module, which is not specifically limited here.

It should be appreciated that the numbers of the user terminals, the servers, the TV terminals and the networks in FIG. 1 are merely illustrative. Any number of user terminals, servers, TV terminals and networks may be provided based on the actual requirements.

Figure 2:
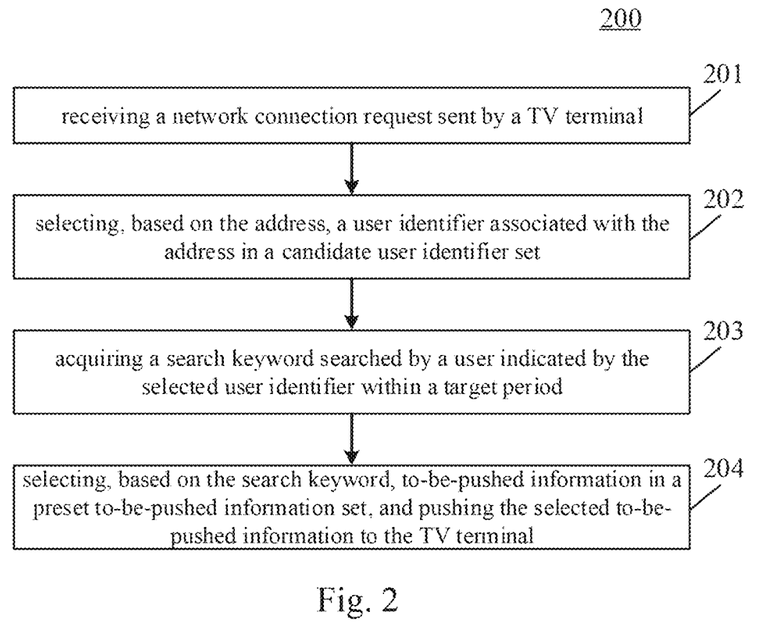
FIG. 2 is a flowchart of an embodiment of a method for pushing information according to the present disclosure.

With further reference to FIG. 2, a flow 200 of an embodiment of a method for pushing information according to the present disclosure is illustrated. The flow 200 of the method for pushing information includes the following steps:

Step 201, receiving a network connection request sent by a TV terminal.

In the present embodiment, an execution body (for example, the server shown in FIG. 1) of the method for pushing information may receive a network connection request sent by a TV terminal. The network connection request may include an address related to the TV terminal. The address related to the TV terminal may include a MAC (Media Access Control or Medium Access Control) address of the TV terminal, and the MAC address may also be referred to as a physical address or a hardware address, which is used to define the location of a network device. Generally speaking, one electronic device corresponds to one MAC address. The MAC address is determined by the network card and is fixed.

Generally speaking, the network connection request may be sent by the TV terminal in response to detecting that the current condition satisfies a predetermined condition. For example, the predetermined condition may be that the TV terminal is in a power on state and the current time is a predetermined time, and the predetermined time may be eight o'clock, twelve o'clock, twenty o'clock, and the like every day.

Step 202, selecting, based on the address, a user identifier associated with the address in a candidate user identifier set.

In the present embodiment, based on the address related to the TV terminal received in step 201, the execution body may select, based on the address related to the TV terminal, a user identifier associated with the address in a candidate user identifier set. The user identifier (user ID) may be an identifier generated by the execution body when the user interacts with the execution body (for example, sending or receiving data) using an electronic device. The user identifier is usually related to the electronic device, and when the user interacts with the execution body using different electronic devices, the generated user IDs are generally different, that is, it may be ensured that the identifier generated for each electronic device is not repeated. The user identifier may also be associated with both the electronic device and a user account. When the user interacts with the execution body with different user accounts, the identifiers generated by the execution body may be different. When a given account is logged in on different electronic devices to interact with the execution body, the identifiers generated by the execution body are usually different.

Here, after the execution body generates the user ID, usually an association relationship between the user ID and the address of the electronic device is established, and the address of the electronic device includes an IP address (Internet Protocol Address), a MAC address, and etc. of the electronic device.

In the present embodiment, the execution body may store a corresponding relationship between a MAC address of a target TV terminal and a MAC address of the user terminal that connects to a router to which the target TV terminal is connected. The execution body may use the MAC address of the TV terminal to query the MAC address of the user terminal that connects to the router to which the target TV terminal is connected. Then, the user identifier whose corresponding MAC address is the queried MAC address is selected in the candidate user identifier set.

Step 203, acquiring a search keyword searched by a user indicated by the selected user identifier within a target period.

In the present embodiment, the execution body may acquire a search keyword searched by a user indicated by the user identifier selected in step 202 within a target period. The target period may be an manually specified predetermined period, for example, within the last month, within the last two weeks, etc., and the target period may also be set according to a set of logic rules. The execution body may store a target user identifier and the search keyword searched by the user by using the target user identifier. The search keyword may be a keyword inputted by the user in the search box for searching, or may be a search keyword included in a text link clicked by the user. For example, the execution body may acquire the search keywords searched by the user indicated by the selected user identifier in the last two weeks, including: car, swimming course, running machine, and formaldehyde scavenger.

Step 204, selecting, based on the search keyword, to-be-pushed information in a preset to-be-pushed information set, and pushing the selected to-be-pushed information to the TV terminal.

In the present embodiment, the execution entity may select to-be-pushed information in a preset to-be-pushed information set based on the search keyword obtained in step 203, and may push the selected to-be-pushed information to the TV terminal. The execution body may select to-be-pushed information including the above search keyword in the preset to-be-pushed information set. For example, if the search keywords include: car, swimming course, running machine, and formaldehyde scavenger, the execution body may select, in the preset to-be-pushed information set, to-be-pushed information including at least one of car, swimming course, running machine, or formaldehyde scavenger.

In some alternative implementations of the present embodiment, the network connection request may be sent by the TV terminal in response to detecting a predetermined operation of the user, and the predetermined operation may include at least one of the following: a power on operation, or a video browsing operation. For example, a pressing operation on the switch button on the TV terminal by the user, or a pressing operation on the switch button on the manipulator matching the TV terminal, or a posture operation of the user performing a predetermined posture (for example, an action of the user opening the arms) may be determined as the user's power on operation. The user's click operation on the video title or a click operation on the picture representing the video or a click operation on the play button for representing the video may be determined as the user's video browsing operation.

In some alternative implementations of the present embodiment, the execution body may select, based on the search keyword, to-be-pushed information in a preset to-be-pushed information set according to the following method: first, for the to-be-pushed information in the preset to-be-pushed information set, the execution body may determine the matching degree between the search keyword and the to-be-pushed information. It should be noted that the to-be-pushed information in the preset to-be-pushed information set may be part of the to-be-pushed information in the to-be-pushed information set, or may be all the to-be-pushed information in the to-be-pushed information set. The to-be-pushed information in the to-be-pushed information set generally corresponds to a push keyword, and the execution body may perform a calculation of the matching degree between the search keyword and the push keyword corresponding to the to-be-pushed information by using a well-known text similarity calculation method such as a cosine similarity algorithm or a Jaccard coefficient. The calculated matching degree may be determined as the matching degree between the search keyword and the to-be-pushed information. Then, the execution body may select a preset number (for example, three, five, etc.) of pieces of to-be-pushed information from the to-be-pushed information set in descending order of matching degree.

Figure 3:
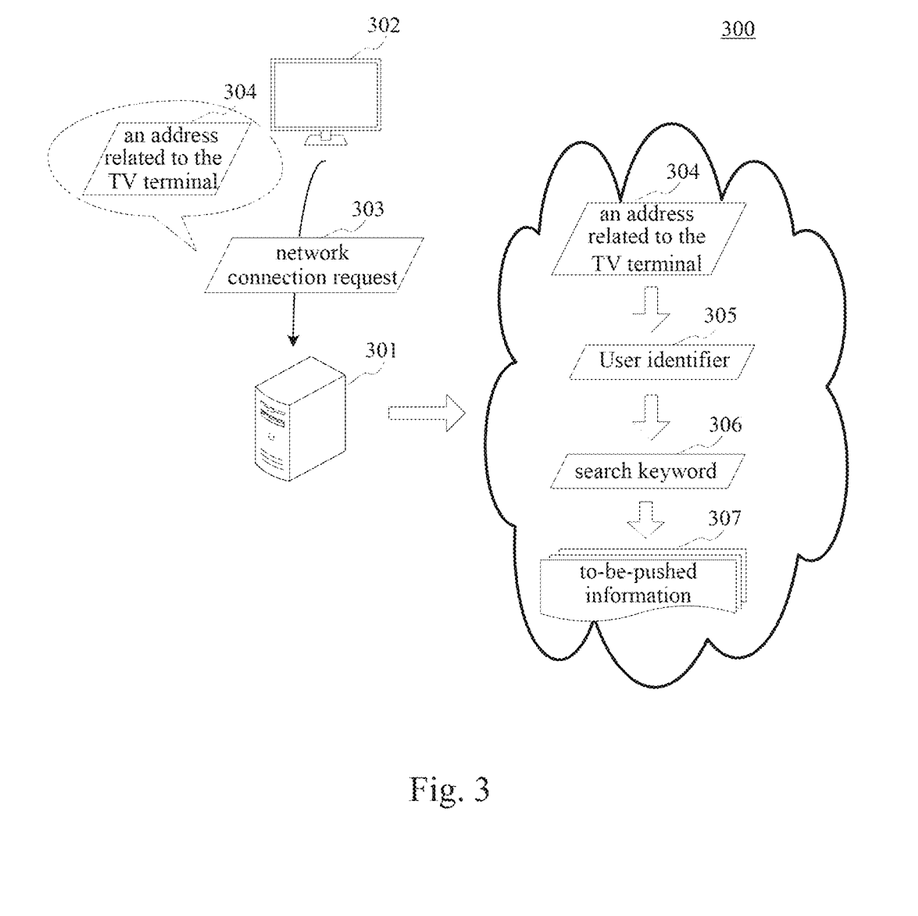
FIG. 3 is a schematic diagram of an application scenario of the method for pushing information according to the present disclosure.

With further reference to FIG. 3, FIG. 3 is a schematic diagram of an application scenario of the method for pushing information according to the present embodiment. In the application scenario of FIG. 3, when a TV terminal 302 detects that the current state is the power-on state and the current time is eight o'clock, an execution body 301 for pushing information may receive a network connection request 303 sent by the TV terminal 302, and the network connection request 303 may include address 304 related to the TV terminal 302, for example, the MAC address of the TV terminal 302 is: 00-27-5A-12-99-43. Then, the execution body 301 may use the MAC address "00-27-5A-12-99-43" of the TV terminal 302 to find that the MAC address of the user terminal that connects to the router to which the TV terminal 302 is connected is E8-37-0C-32-0A-15 and 00-27-5D-13-54-43. Then, a user identifier 305 whose corresponding MAC address is "E8-37-0C-32-0A-15" may be selected as "26478" in a candidate user identifier set, and the user identifier 305 whose corresponding MAC address is "00-27-5D-13-54-43" is "65354". Then, the execution body 301 may acquire search keywords 306 searched by the user indicated by the user identifier "26478" in the last two weeks, including: car and swimming course, and acquire search keywords 306 searched by the user indicated by the user identifier "65354" in the last two weeks, including: running machine and formaldehyde scavenger. Finally, the execution body 301 may select, in a preset to-be-pushed information set, to-be-pushed information 307 including at least one of the search keywords "car", "swimming course", "running machine", and "formaldehyde scavenger", and push the selected to-be-pushed information 307 to the TV terminal 302.

The method provided by the above embodiments of the present disclosure utilizes the address related to the TV terminal, queries personalized information of the audience of the TV terminal, and improves the richness of the to-be-pushed information while improving the pertinence of information push.

Figure 4:
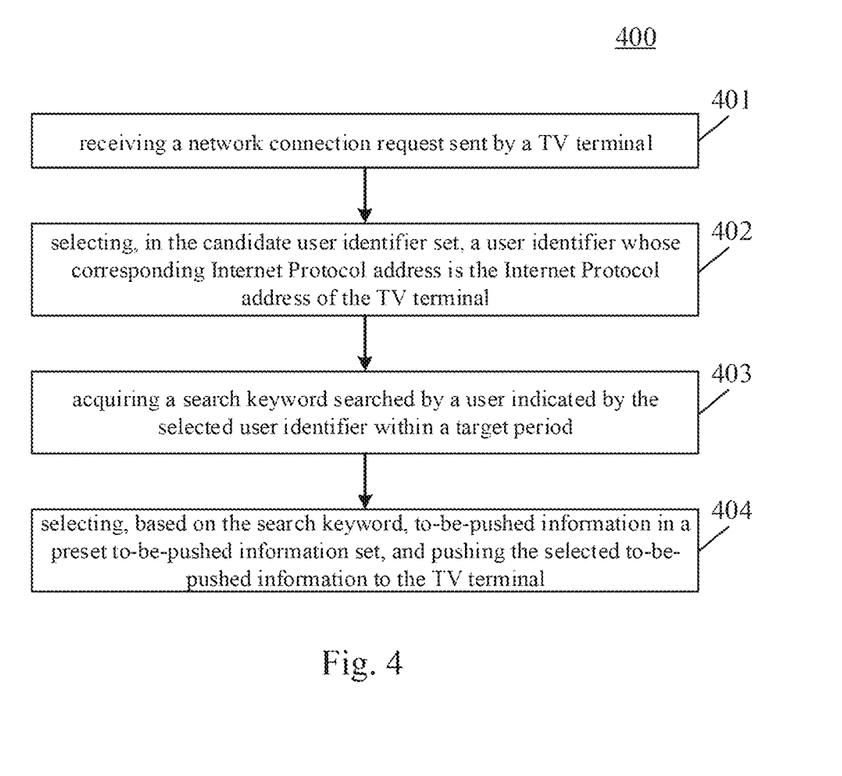
FIG. 4 is a flowchart of another embodiment of the method for pushing information according to the present disclosure.

With further reference to FIG. 4, a flow 400 of another embodiment of the method for pushing information is illustrated. The flow 400 of the method for pushing information includes the following steps:

Step 401, receiving a network connection request sent by a TV terminal.

In the present embodiment, the operation of step 401 is substantially the same as the operation of step 201, and detailed description thereof will be omitted.

Step 402, selecting, in the candidate user identifier set, a user identifier having a corresponding Internet Protocol address being the Internet Protocol address of the TV terminal.

In the present embodiment, the address related to the TV terminal may include an Internet Protocol Address (IP address) of the TV terminal, and the IP address may also be referred to as an Internet Protocol address. An IP address is a unified address format provided by the IP protocol. It assigns a logical address to each network and each host on the Internet to shield the difference in physical addresses.

In the present embodiment, a corresponding relationship between the user identifier and the Internet Protocol address may be pre-stored in the execution body. For example, the corresponding relationship may be stored in a corresponding relationship table for characterizing the corresponding relationship between the user identifier and the Internet Protocol address.

In the present embodiment, the execution body may select, in the candidate user identifier set, a user identifier whose corresponding Internet Protocol address is the Internet Protocol address of the TV terminal. For example, if the IP address of the TV terminal is 39.155.216.77, the execution body may select a user identifier having a corresponding IP address of 39.155.216.77 in the candidate user identifier set. The execution body may determine all or part of the generated user identifiers as the candidate user identifier set.

Step 403, acquiring a search keyword searched by a user indicated by the selected user identifier within a target period.

Step 404, selecting, based on the search keyword, to-be-pushed information in a preset to-be-pushed information set, and pushing the selected to-be-pushed information to the TV terminal.

In the present embodiment, the operations of steps 403 to 404 are substantially the same as the operations of steps 203 to 204, and detailed description thereof will be omitted.

As can be seen from FIG. 4, as compared with the embodiment corresponding to FIG. 2, the flow 400 of the method for pushing information in the present embodiment increases the step of selecting a user identifier by using the Internet Protocol address of the TV terminal. Therefore, the solution described in the present embodiment may improve the accuracy of information push while improving the richness of the to-be-pushed information.

Figure 5:
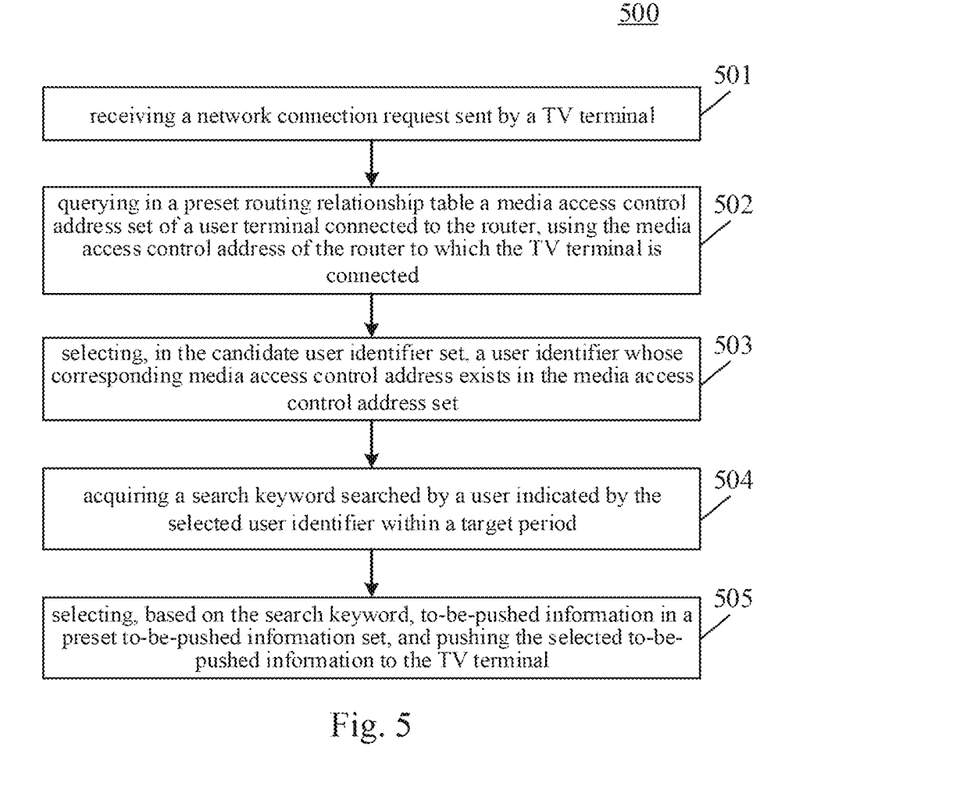
FIG. 5 is a flowchart of another embodiment of the method for pushing information according to the present disclosure.

With further reference to FIG. 5, a flow 500 of another embodiment of the method for pushing information is illustrated. The flow 500 of the method for pushing information includes the following steps:

Step 501, receiving a network connection request sent by a TV terminal.

In the present embodiment, the operation of step 501 is substantially the same as the operation of step 201, and detailed description thereof will be omitted.

Step 502, querying in a preset routing relationship table a media access control address set of a user terminal connected to the router, using the media access control address of the router to which the TV terminal is connected.

In the present embodiment, the address related to the TV terminal may include the media access control address of the router to which the TV terminal is connected.

In the present embodiment, the execution body may pre-store a routing relationship table used for representing a corresponding relationship between a media access control address of a target router and a media access control address of a user terminal connected to the target router. Each TV terminal may send to the execution body a routing relationship table of the router to which TV terminal is connected. Generally speaking, a user terminal on a router connected to a home local area network is typically the user terminal used by the family members.

In the present embodiment, the corresponding relationship between the user identifier and the media access control address may be pre-stored in the execution body. For example, the corresponding relationship may be stored in a corresponding relationship table for characterizing the corresponding relationship between the user identifier and the media access control address. The execution body may first query in the routing relationship table a media access control address set of a user terminal connected to the router, using the media access control address of the router to which the TV terminal is connected.

Step 503, selecting, in the candidate user identifier set, a user identifier whose corresponding media access control address exists in the media access control address set.

In the present embodiment, the execution body may select, in the candidate user identifier set, a user identifier whose corresponding media access control address exists in the media access control address set. For example, if the MAC address of the router to which the TV terminal is connected is: 00-50-BA-CE-07-0C, the execution body may find in the routing relationship table that the MAC address of the user terminal connected to the router is 00-23-5A-15-99-42 and E8-35-0C-32-0A-11; then, the execution body may select, in the candidate user identifier set, the user identifier having the corresponding MAC address of 00-23-5A-15-99-42 or E8-35-0C-32-0A-11.

Step 504, acquiring a search keyword searched by a user indicated by the selected user identifier within a target period.

Step 505, selecting, based on the search keyword, to-be-pushed information in a preset to-be-pushed information set, and pushing the selected to-be-pushed information to the TV terminal.

In the present embodiment, the operations of steps 504 to 505 are substantially the same as the operations of steps 203 to 204, and detailed description thereof will be omitted.

It should be noted that the embodiments may be combined with each other. For example, the method for selecting a user identifier in step 402 of the flow 400 and the method for selecting a user identifier in step 502 and step 503 of the flow 500 may be used together to select the user identifier.

As can be seen from FIG. 5, as compared with the embodiment corresponding to FIG. 2, the flow 500 of the method for pushing information in the present embodiment increases the step of selecting a user identifier using the media access control address of the router to which the TV terminal is connected. Therefore, the solution described in the present embodiment may improve the accuracy of information push while improving the richness of the to-be-pushed information.

Figure 6:
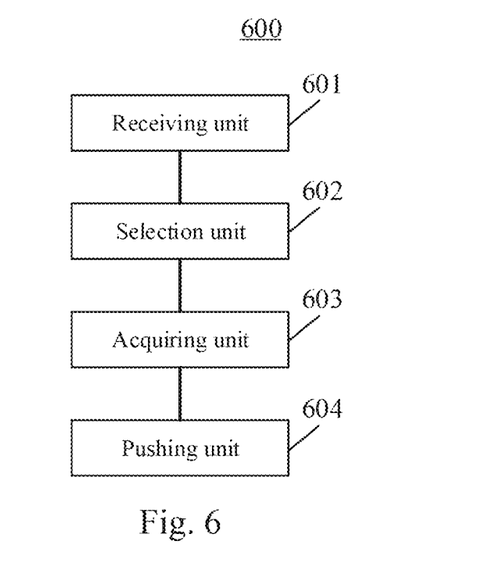
FIG. 6 is a schematic structural diagram of an embodiment of an apparatus for pushing information according to the present disclosure.

With further reference to FIG. 6, as an implementation to the method shown in the above figures, the present disclosure provides an embodiment of an apparatus for pushing information. The apparatus embodiment corresponds to the method embodiment shown in FIG. 2, and the apparatus may specifically be applied to various electronic devices.

As shown in FIG. 6, the apparatus 600 for pushing information of the present embodiment includes: a receiving unit 601, a selection unit 602, an acquiring unit 603 and a pushing unit 604. The receiving unit 601 is configured to receive a network connection request sent by a TV terminal, the network connection request including an address related to the TV terminal. The selection unit 602 is configured to select, based on the address, a user identifier associated with the address in a candidate user identifier set. The acquiring unit 603 is configured to acquire a search keyword searched by a user indicated by the selected user identifier within a target period. The pushing unit 604 is configured to select, based on the search keyword, to-be-pushed information in a preset to-be-pushed information set, and push the selected to-be-pushed information to the TV terminal.

In some alternative implementations of the present embodiment, the address related to the TV terminal may include an Internet Protocol Address (IP address) of the TV terminal, and the IP address may also be referred to as an Internet Protocol address. An IP address is a unified address format provided by the IP protocol. It assigns a logical address to each network and each host on the Internet to shield the difference in physical addresses. A corresponding relationship between the user identifier and the Internet Protocol address may be pre-stored in the execution body. For example, the corresponding relationship may be stored in a corresponding relationship table which is for characterizing the corresponding relationship between the user identifier and the Internet Protocol address. The selection unit 602 may be further configured to select, based on the address, a user identifier associated with the address in the candidate user identifier set according to the following method: the selection unit 602 may select, in the candidate user identifier set, a user identifier whose corresponding Internet Protocol address is the Internet Protocol address of the TV terminal. For example, if the IP address of the TV terminal is 39.155.216.77, the selection unit 602 may select a user identifier having the corresponding IP address of 39.155.216.77 in the candidate user identifier set.

In some alternative implementations of the present embodiment, the address related to the TV terminal may include the media access control address of the router to which the TV terminal is connected. The execution body may pre-store a routing relationship table which is used to represent a corresponding relationship between a media access control address of a target router and a media access control address of a user terminal connected to the target router. Each TV terminal may send to the execution body a routing relationship table of the router to which TV terminal is connected. Generally speaking, a user terminal on a router connected to a home local area network is typically the user terminal used by the family members. In the selection unit 602, the corresponding relationship between the user identifier and the media access control address may be pre-stored. For example, the corresponding relationship may be stored in a corresponding relationship table which is for characterizing the corresponding relationship between the user identifier and the media access control address. The selection unit 602 may first query in the routing relationship table a media access control address set of a user terminal connected to the router, using the media access control address of the router to which the TV terminal is connected. Then, in the candidate user identifier set, a user identifier whose corresponding media access control address exists in the media access control address set may be selected. For example, if the MAC address of the router to which the TV terminal is connected is: 00-50-BA-CE-07-0C, the selection unit 602 may query the routing relationship table for the MAC address of the user terminal connected to the router: 00-23-5A-15-99-42 and E8-35-0C-32-0A-11; then, the selection unit 602 may select, in the candidate user identifier set, the user identifier having the corresponding MAC address of 00-23-5A-15-99-42 or E8-35-0C-32-0A-11.

In some alternative implementations of the present embodiment, the network connection request may be sent by the TV terminal in response to detecting a predetermined operation of the user, and the predetermined operation may include at least one of the following: a power on operation, or a video browsing operation. For example, a pressing operation on the switch button on the TV terminal by the user, or a pressing operation on the switch button on the manipulator matching the TV terminal may be determined as the user's power on operation. The user's click operation on the video title or a click operation on the picture characterizing the video or a click operation on the play button for characterizing the video may be determined as the user's video browsing operation.

In some alternative implementations of the present embodiment, the pushing unit 604 may select, based on the search keyword, to-be-pushed information in a preset to-be-pushed information set according to the following method: first, for the to-be-pushed information in the preset to-be-pushed information set, the pushing unit 604 may determine a matching degree between the search keyword and the to-be-pushed information. It should be noted that the to-be-pushed information in the preset to-be-pushed information set may be part of the to-be-pushed information in the to-be-pushed information set, or may be all the to-be-pushed information in the to-be-pushed information set. The to-be-pushed information in the to-be-pushed information set generally corresponds to a push keyword, and the pushing unit 604 may perform a calculation of the matching degree between the search keyword and the push keyword corresponding to the to-be-pushed information by using a well-known text similarity calculation method such as a cosine similarity algorithm or a Jaccard coefficient. The calculated matching degree may be determined as the matching degree between the search keyword and the to-be-pushed information. Then, the pushing unit 604 may select a preset number (for example, three, five, etc.) of pieces of to-be-pushed information from the to-be-pushed information set in descending order of matching degree.

The units described in apparatus 600 correspond to the various steps in the method described with reference to FIGS. 2, 4 and 5. Thus, the operations and features described above for the method are equally applicable to the apparatus 600 and the units contained therein, and detailed description thereof will be omitted.

The apparatus for pushing information provided by the above embodiment of the present disclosure first receives a network connection request sent by a TV terminal, the network connection request including an address related to the TV terminal, then may select, based on the address related to the TV terminal, a user identifier associated with the address in a candidate user identifier set, then may obtain a search keyword searched by a user indicated by the selected user identifier within a target period, and finally may select, based on the search keyword, to-be-pushed information in a preset to-be-pushed information set, and push the selected to-be-pushed information to the TV terminal. Therefore, the address related to the TV terminal is effectively utilized, personalized information of the audience of the TV terminal is queried, and the richness of the to-be-pushed information is improved while improving the pertinence of information push.

Figure 7:
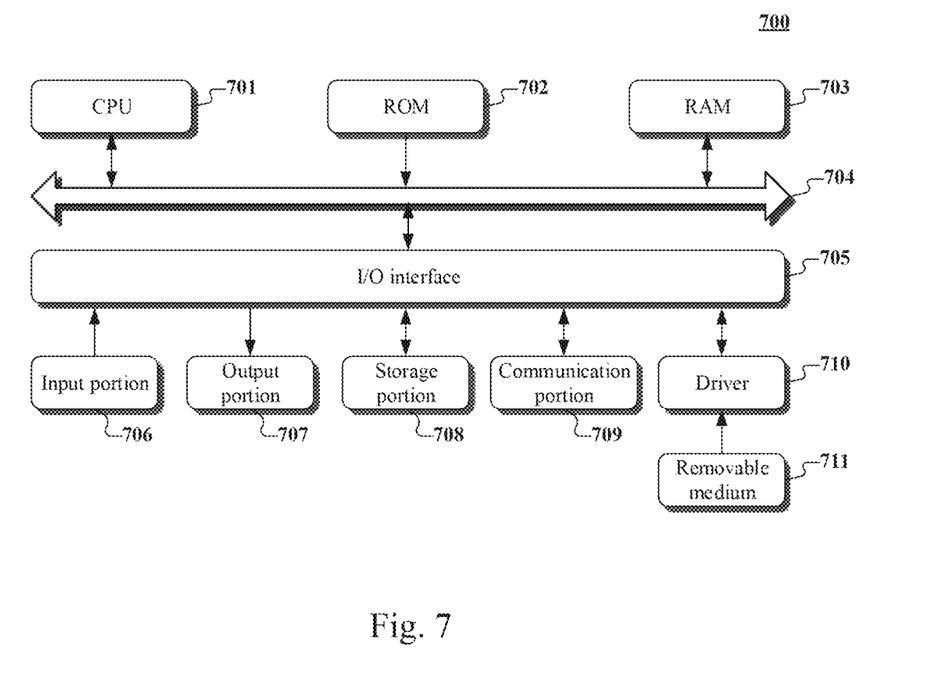
FIG. 7 is a schematic structural diagram of a computer system adapted to implement an electronic device of the embodiments of the present disclosure.

Referring to FIG. 7, a schematic structural diagram of a computer system 700 adapted to implement an electronic device of the embodiments of the present disclosure is shown. The electronic device shown in FIG. 7 is merely an example, and should not limit the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a receiving unit, a selection unit, an obtaining unit and a pushing unit. Here, the names of these units do not in some cases constitute a limitation to such units themselves. For example, the receiving unit may also be described as "a unit for receiving a network connection request sent by a TV terminal."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: receive a network connection request sent by a TV terminal, the network connection request including an address related to the TV terminal; select, based on the address, a user identifier associated with the address in a candidate user identifier set; acquire a search keyword searched by a user indicated by the selected user identifier within a target period; and select, based on the search keyword, to-be-pushed information in a preset to-be-pushed information set, and pushing the selected to-be-pushed information to the TV terminal.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A computer-implemented method for pushing information to a television (TV) terminal, the method comprising:
    receiving a network connection request sent by the TV terminal, the network connection request comprising a media access control (MAC) address of a router connected to the TV terminal;
    selecting, in a candidate user identifier set including at least two candidate user identifiers, based on the MAC address of the router connected to the TV terminal, a user identifier associated with the MAC address of the router connected to the TV terminal, wherein a user identifier is associated with a user terminal and different user identifiers are associated with different user terminals;
    acquiring search keywords searched by a user terminal indicated by the selected user identifier within a target period, wherein the search keywords are acquired from the user terminal separate from the TV terminal in response to the network connection request sent from the TV terminal being received and the user identifier associated with the address related to the TV terminal being selected; and
    selecting, based on a search keyword in the acquired search keywords, to-be-pushed information in a preset to-be-pushed information set, and pushing the selected to-be-pushed information to the TV terminal,
    wherein the selecting, in the candidate user identifier set including at least two candidate user identifiers, based on the MAC address of the router connected to the TV terminal, the user identifier associated with the MAC address of the router connected to the TV terminal, comprises:
        querying, in a preset routing relationship table, a set of MAC addresses of user terminals connected to the router using the MAC address of the router connected to the TV terminal, wherein the routing relationship table is used to represent corresponding relationships between a MAC address of a target router and MAC addresses of user terminals connected to the target router; and
        selecting, in the candidate user identifier set including the at least two candidate user identifiers, a user identifier corresponding to a MAC address existing in the set of MAC addresses, wherein a corresponding relationship between the user identifier and the MAC addresses is pre-stored,
    wherein the method is performed by at least one processor.

2. The computer-implemented method according to claim 1, wherein the network connection request is sent by the TV terminal in response to detecting a predetermined operation of the user, and the predetermined operation comprises at least one of: a power on operation, or a video browsing operation.

3. The computer-implemented method according to claim 1, wherein the selecting, based on the search keyword, to-be-pushed information in a preset to-be-pushed information set comprises:
   determining, for the to-be-pushed information in the preset to-be-pushed information set, a matching degree between the search keyword and the to-be-pushed information; and
   selecting a preset number of pieces of to-be-pushed information from the to-be-pushed information set in a descending order of the matching degree.

4. An apparatus for pushing information to a television (TV) terminal, the apparatus comprising:
   at least one processor; and
   a memory storing instructions, the instructions when executed by the at least one processor, cause the at least one processor to perform operations, the operations comprising:
   receiving a network connection request sent by the TV terminal, the network connection request comprising a media access control (MAC) address of a router connected to the TV terminal;
   selecting, in a candidate user identifier set including at least two candidate user identifiers, based on the MAC address of the router connected to the TV terminal, a user identifier associated with the MAC address of the router connected to the TV terminal, wherein a user identifier is associated with a user terminal and different user identifiers are associated with different user terminals;
   acquiring search keywords searched by a user terminal indicated by the selected user identifier within a target period, wherein the search keywords are acquired from the user terminal separate from the TV terminal in response to the network connection request sent from the TV terminal being received and the user identifier associated with the address related to the TV terminal being selected; and
   selecting, based on a search keyword in the acquired search keywords, to-be-pushed information in a preset to-be-pushed information set, and pushing the selected to-be-pushed information to the TV terminal,
   wherein the selecting, in the candidate user identifier set including at least two candidate user identifiers, based on the MAC address of the router connected to the TV terminal, the user identifier associated with the MAC address of the router connected to the TV terminal, comprises:
      querying, in a preset routing relationship table, a set of MAC addresses of user terminals connected to the router using the MAC address of the router connected to the TV terminal, wherein the routing relationship table is used to represent corresponding relationships between a MAC address of a target router and MAC addresses of user terminals connected to the target router; and
      selecting, in the candidate user identifier set including the at least two candidate user identifiers, a user identifier corresponding to a MAC address existing in the set of MAC addresses, wherein a corresponding relationship between the user identifier and the MAC addresses is pre-stored.

5. The apparatus according to claim 4, wherein the network connection request is sent by the TV terminal in response to detecting a predetermined operation of the user, and the predetermined operation comprises at least one of: a power on operation, or a video browsing operation.

6. The apparatus according to claim 4, wherein the selecting, based on the search keyword, to-be-pushed information in a preset to-be-pushed information set, comprises:
   determining, for the to-be-pushed information in the preset to-be-pushed information set, a matching degree between the search keyword and the to-be-pushed information; and
   selecting a preset number of pieces of to-be-pushed information from the to-be-pushed information set in a descending order of the matching degree.

7. A non-transitory computer readable storage medium storing a computer program, wherein the computer program, when executed by a processor, cause the processor to perform operations, the operations comprising:
   receiving a network connection request sent by a television (TV) terminal, the network connection request comprising a media access control (MAC) address of a router connected to the TV terminal;
   selecting, in a candidate user identifier set including at least two candidate user identifiers, based on the MAC address of the router connected to the TV terminal, a user identifier associated with the MAC address of the router connected to the TV terminal, wherein a user identifier is associated with a user terminal and different user identifiers are associated with different user terminals;
   acquiring search keywords searched by a user terminal indicated by the selected user identifier within a target period, wherein the search keywords are acquired from the user terminal separate from the TV terminal in response to the network connection request sent from the TV terminal being received and the user identifier associated with the address related to the TV terminal being selected; and
   selecting, based on a search keyword in the acquired search keywords, to-be-pushed information in a preset to-be-pushed information set, and pushing the selected to-be-pushed information to the TV terminal,
   wherein the selecting, in the candidate user identifier set including at least two candidate user identifiers, based on the MAC address of the router connected to the TV terminal, the user identifier associated with the MAC address of the router connected to the TV terminal, comprises:
      querying, in a preset routing relationship table, a set of MAC addresses of user terminals connected to the router using the MAC address of the router connected to the TV terminal, wherein the routing relationship table is used to represent corresponding relationships between a MAC address of a target router and MAC addresses of user terminals connected to the target router; and
      selecting, in the candidate user identifier set including the at least two candidate user identifiers, a user identifier corresponding to a MAC address existing in the set of MAC addresses, wherein a corresponding relationship between the user identifier and the MAC addresses is pre-stored.

8. The computer-implemented method according to claim 1, wherein the user terminal separate from the TV terminal comprises a smart phone.

9. The computer-implemented method according to claim 1, wherein the user identifier is associated with both the user terminal and a user account, and different user accounts are associated with different identifiers.

10. The computer-implemented method according to claim 1, wherein the method further comprises:
  determining that the TV terminal is connected to the same home network as the user terminal based on a MAC address of a router connected to the TV terminal and a routing relationship table, wherein the routing relationship table includes the MAC address for the user terminal and the TV terminal,
  wherein acquiring the search keywords is performed in response to determining that the TV terminal is connected to the same home network as the user terminal.

* * * * *